United States Patent [19]

Rindfleisch et al.

[11] Patent Number: 4,652,477
[45] Date of Patent: Mar. 24, 1987

[54] COVERING MATERIAL

[76] Inventors: Werner Rindfleisch; Stefan Rindfleisch, both of Hauptstr. 25, 6251 Waldbrunn-Lahr, Fed. Rep. of Germany

[21] Appl. No.: 720,546

[22] Filed: Apr. 8, 1985

[30] Foreign Application Priority Data

Apr. 6, 1984 [DE] Fed. Rep. of Germany ....... 3413014

[51] Int. Cl.$^4$ .............................................. A61F 13/02
[52] U.S. Cl. .................................. 428/40; 428/537.1; 428/151; 428/15; 428/914
[58] Field of Search ....................... 428/40, 537.1, 151, 428/914, 15

[56] References Cited

U.S. PATENT DOCUMENTS 3,385,743  5/1968  Backberg .............................. 428/40
4,552,792 12/1985  Julian et al. ........................... 428/40

Primary Examiner—Edith Buffalow
Attorney, Agent, or Firm—Gifford, Groh, VanOphem, Sheridan, Sprinkle and Dolgorukov

[57] ABSTRACT

A cover material is formed of veneer and a splitable layer which is glued to a flex-resistant support. Paper having glue layers on both sides serves as the splitable layer. The finished veneer sheet material can be released from the support by means of a blunt blade, and can be struck to a door surface or another large area object as a whole piece.

11 Claims, 5 Drawing Figures

COVERING MATERIAL

The invention relates to a finished veneer sheet material and in particular to one for sticking to doors, furniture or walls. The invention also relates to a process for manufacturing the veneer sheet material.

BACKGROUND AND SUMMARY OF THE INVENTION

It is known to provide printed synthetic foil having the appearance of a wood veneer with adhesive on one side and to protect this adhesive layer with a covering sheet, so as to obtain a transportable sheet material which can be distributed in shops. The user removes the covering sheet and can then stick the printed synthetic foil directly onto doors, furniture or walls, without needing to use a press.

When the printed synthetic foil would be replaced by a veneer, i.e. by a thin layer of wood, such a product would be useless for the final user. The reason for this lies in the fact that the veneer is a wood material, and as such alters ("moves") due to ambient influences, and in particular becomes wrinkled. Therefore in order to cover larger areas satisfactorily, a press has to be used. For these reasons there is no finished veneer sheet material on the market which can be worked in the simple manner as is the case with printed synthetic foils.

It is an object of the invention to produce a finished veneer sheet material as a new product which can be worked as easily as can printed synthetic foils.

A further object of the invention is to produce a finished veneer sheet material which can be stuck over a large area onto objects such as doors, furniture or walls, without using a machine press.

A further object of the invention is to prepare a finished veneer sheet material which shows inlay work.

A further object of the invention is to prepare a finished veneer sheet material which is suitable for further processing for inlay work by both cabinet makers and Do-It-Yourself people.

The finished veneer sheet material for sticking onto doors, furniture or walls according to the invention contains at lease a first and a second layered construction, likewise a carrier. The first layered construction contains a veneer layer having an upper side and a lower side. The second layered construction contains a bonding layer which is able to hold the veneer layer together and is able to be releasably bonded to the carrier. The carrier is so constructed as to be resistant to flexing that it is able to stabilise the veneer layer together with the bonding layer from undesirable distortion (buckling as a result of moisture absorption). To apply the finished veneer, the veneer layer is released from the carrier, whereby one can employ a blade having a rounded off cutting edge. The released veneer layer is held together by means of the bonding layer or parts of this bonding layer, even if the veneer layer is comprised of individual veneer pieces, which are assembled somewhat along the lines of an inlay. The veneer layer thus held together on its lower side by means of the bonding layer, is stuck to the desired object as soon as possible before the veneer layer becomes uneven as a result of ambient influences, in particular moisture absorption.

It has proved to be especially advantageous when the second layered construction contains a first glue layer, a paper layer having a first and second surface, and a second glue layer. The first glue layer bonds the lower side of the veneer layer to the surface of the paper layer and thereby develops a first bonding strength. The second surface of the paper layer is stuck to the carrier and thereby develops a second bonding strength. The paper layer contains fibres which mutually exhibit a third bonding strength. The materials are so selected that the third bonding strength is smaller than the first bonding strength and also smaller than the second bonding strength. Therefore when the veneer layer is released from the carrier by the separating blade, the paper is split and one part of the paper fibres adheres to the lower side of the veneer layer, whilst the other part of the paper fibres remains adhered to the carrier.

The upper side of the veneer layer can bear a lacquer layer as is the case with usual veneer surfaces. Of course the veneer is previously sanded, likewise stained (treated with colour solution) and primed.

The finished veneer sheet material can also be so constructed that it is suitable for further processing for inlay work. For this purpose a third and a fourth layered construction are provided which are arranged on the first layered construction. The third layered construction contains a second veneer layer having an upper side and a lower side. The fourth layered construction contains a second bonding layer which is able to hold the second veneer layer together and to releasably bond with the first layered construction. Accordingly when the second veneer layer is transversly severed by means of a knife along a closed line, the severed veneer piece is released by means of a blunt blade from the bond and can be replaced by a correspondingly shaped veneer piece, which is stuck into the gap created. Also the interested Do-It-Yourself man can carry out inlay work in this manner.

DESCRIPTION OF THE PREFERRED EMBODIMENT

Figure 1:
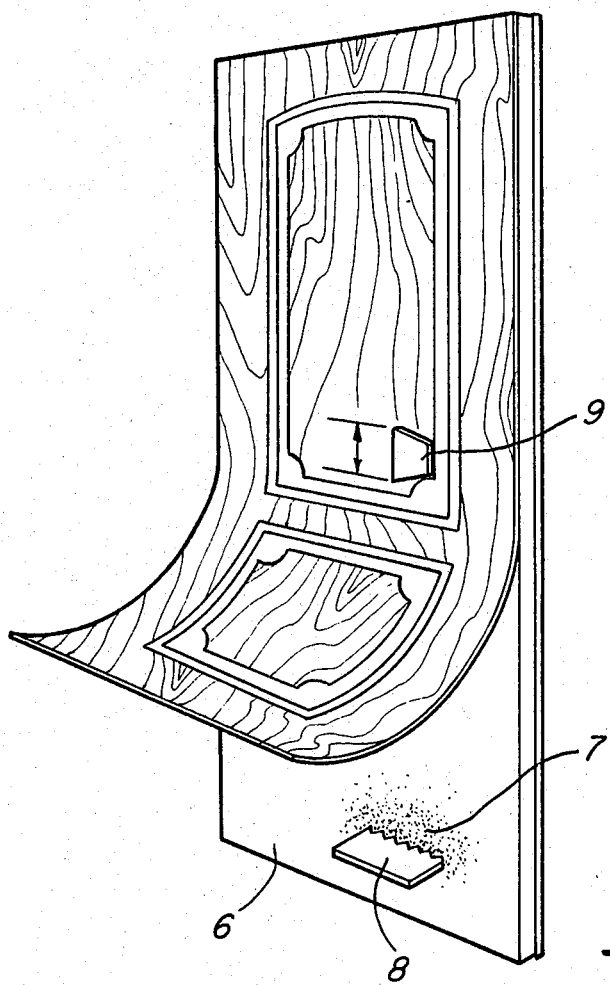
FIG. 1 is a diagrammatic representation of sticking the finished veneer material onto a door.

FIG. 1 shows how the finished veneer sheet material, having a first layered construction 1 and a second layered construction 2, is stuck onto a door 6. On the surface of door 6, adhesive material 7 is applied with a spreader 8, and the finished veneer sheet material having a first and a second layered construction 1, 2 is pressed on by a wood member 9. As can be seen, the finished veneer sheet material can be comprised of differing types of wood, which are assembled in the form of inlay work.

Figure 2:
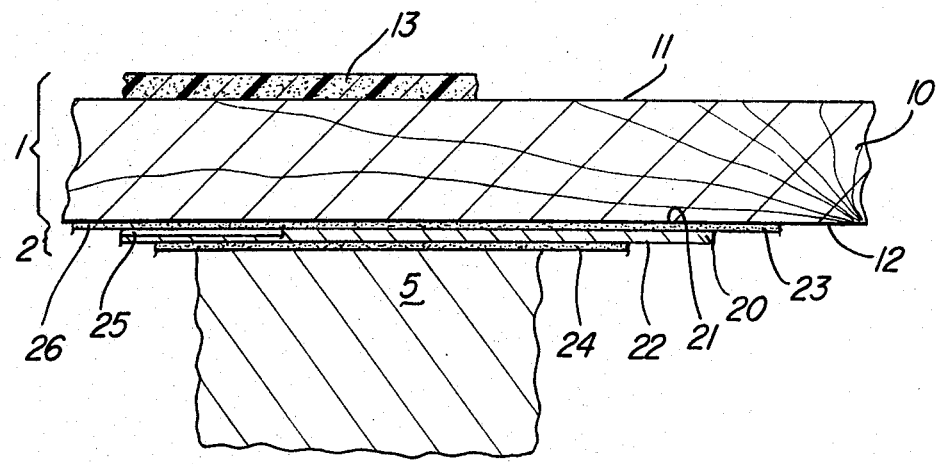
FIG. 2 shows a enlarged cross-section of the finished veneer sheet material on a wood fibre plate as a carrier.

FIG. 2 shows an enlarged cross-section of the finished veneer sheet material. This contains the first layered construction 1 and the second layered construction 2 which are stuck to a carrier 5. Carrier 5 can be compressed wood plate having a thickness of 3 to 4 mm, but it is also possible to use a sufficiently rigid aluminium sheet or plate. It is pointed out that carrier 5 is so constructed as to be resistant to flexing, so that it is able to stabilise the veneer layer 1 together with bonding layer 2 from undesirable distortion. As veneer is comprised of wood, it has the tendency to warp or buckle, especially from the effects of moisture. This is prevented by means of the tight bond of the layered construction 1, 2 with carrier 5.

The first layered construction contains a veneer layer 10, which can have a thickness of 0.3 to 1.5 mm. It is not essential that the veneer layer 10 should be comprised of a uniform wood, it is also possible for it to be assembled from differing types of wood. The veneer layer 10 can also be stained (dyed) and treated with impregnating agents. The veneer layer has an upper side 11 and a lower side 12. Upper side 11 is usually sanded and coated with lacquer layer 13.

The second layered construction 2 contains a paper layer 20, having a first surface 21 and a second surface 22. The first surface 21 is stuck to the lower side 12 of veneer layer 10 by means of a glue layer 23, and whereby a first bonding strength is developed. The second surface 22 of the paper layer 20 is stuck to carrier 5 by means of a second glue layer 24, and whereby a second bonding strength is developed. Paper layer 20 contains fibres which achieve the cohesion of paper layer 20 and represent a third bonding strength. The bonding strength developed from the first glue layer 23 is at all events greater than the third bonding strength. The second bonding strength can also be greater than the third bonding strength. These prerequisites result if a wood glue made by the company Levonal GmbH, labeled "levonal 150/UR", is selected for glue layers 23, 24.

For manufacturing the finished veneer sheet material, paper level 20 together with the intermediate glue layer 24, and veneer layer 10 together with the intermediate glue layer 23, are stacked onto one another, inserted into a heated press and compressed. The press temperature can amount to 60 degrees C. so as to achieve a quicker curing of the wood glue.

The second layered construction 2 can also contain a second paper layer 25 in addition to paper inlet 20, which is preferably impregnated with a melamine resin, and is secured to the lower side 12 of the veneer layer 10 by means of an adhesive layer 26. Impregnation with a melamine resin produces a protection against the effects of moisture. Therefore the so constructed finished veneer sheet material has less tendency to distortion or buckling. When veneer layer 10 is securely bonded in the described manner with support 3, outer side 11 is sanded in the usual way and if need be is also stained (treated with a colour solution). Lacquer layer 13 can also be applied as a finish.

Figure 3:
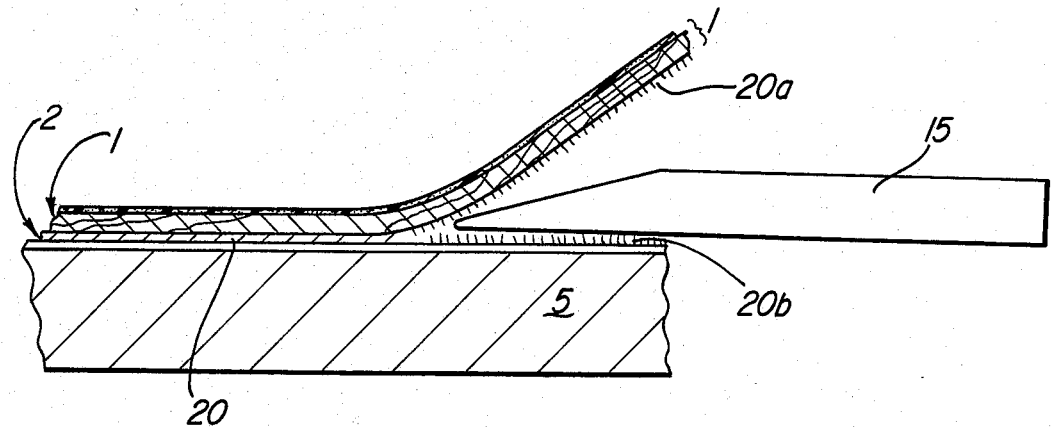
FIG. 3 shows the process of releasing the finished veneer sheet material from the carrier.

The product described in FIG. 2 can be stored and can be sold in consumer markets or directly to the consumer. there the finished veneer sheet material is removed from carrier 5, as is described with the aid of FIG. 3.

A blunt blade 15 is provided for the severance which has a wedge shaped cross-section and being rounded off by about 1 mm at the edge of the wedge. The blade 15 is driven into paper layer 20 so that this splits up. This results due to the fact that the bonding strengths of glue layers 23 and 24 are greater than the bonding strength of the paper fibres together, as previously described. One part of the fibres remains as fibre fleece 20a on the lower side 12 of the veneer layer, and the other part of the paper fibres remains as fibre fleece 20b adhering to support 5. However, the fibre fleece 20a together with glue layer 23 is sufficiently secure to hold the veneer layer 10 together even when this is comprised of individual veneer parts. Cohesion is reinforced by means of paper 25 which is impregnated with melamine resin, which it is therefore preferable to employ when veneer layer 10 is comprised of finely assembled inlay work.

Figure 4:
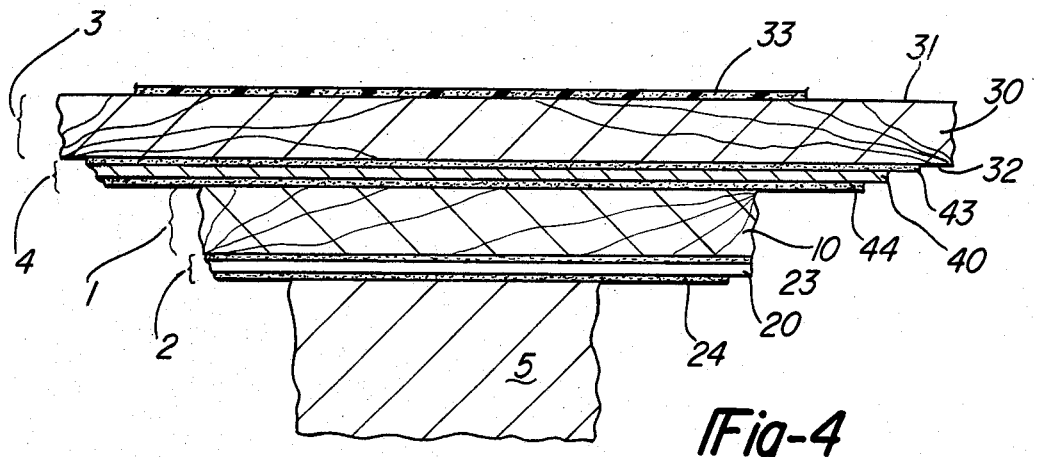
FIG. 4 shows a second embodiment of the finished veneer sheet material for inlay work in a diagrammatically enlarged cross-section.

FIG. 4 shows a cross-section through a finished veneer sheet material which is especially suitable for the execution of inlay work. A third and a fourth layered construction 3, 4 is applied to the already described layered construction 1, 2. In layered construction 1, veneer layer 10 is a simple dummy veneer, whilst in layered construction 3 a useful veneer layer 30 is used. This veneer layer 30 can be assembled from individual veneer parts in the form of an inlay. The upper side 31 of veneer layer 30 is provided with a lacquer layer 33 and on under side 32 is adjacent to layer construction 4, which again is comprised of a glue layer 43, a paper layer 40 and a further glue layer. Also a paper layer impregnated with melamine resin can be introduced as has been illustrated in FIG. 2. Consequently layered construction 4 corresponds essentially to layer construction 2, and layered construction 3 corresponds to layered construction 1. The structure shown in FIG. 4 is produced analogously as to the structure according to FIGS. 2 and therefore need not be explained in detail.

Figure 5:
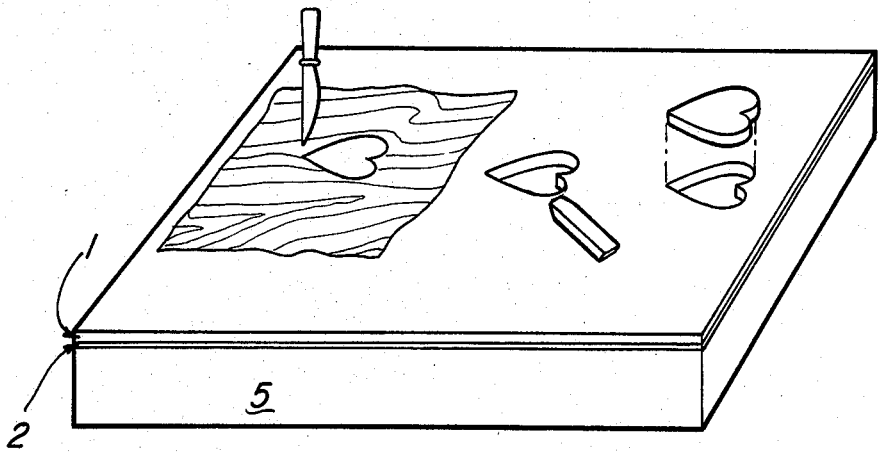
FIG. 5 shows an enlarged diagrammatically perspective representation of the process for inlay work.

FIG. 5 shows how to proceed with inlaid work. A simple veneer sheet is laid onot the finished veneer sheet material, which is securely clamped to support 5, and onto which a line pattern is drawn. This pattern is gone around with a sharp knife and thus severs both the crude veneer and the underlying veneer layer 10, whereby a veneer part is cut out. This can be released from the bond with underlying paper layer 20 by means of a blade similar to that described in conjunction with FIG. 3. The cut out part of the crude veneer layer is inserted into the resulting holes and is stuck in.

Paper that has given satisfactory results in layered construction 2 or 4 is per specification "Natron Kraftpack 80 g".

What is claimed is:

1. A veneer-type sheet material comprising a rigid carrier plate, a wood veneer carried on said rigid plate, and a parting layer disposed between said veneer and said rigid plate; wherein said parting layer releasably bonds said veneer to said rigid plate so as to stabilize said veneer against distortion while carried on said rigid plate wherein said parting layer comprises a paper layer disposed between said veneer and said rigid plate, a first glue layer attaching said paper to said veneer, and a second glue layer affixing said paper to said rigid carrier; wherein said paper layer comprises a first surface portion facing said veneer and permanently fixed thereto by said first glue layer, and a second surface portion facing said rigid plate and tightly bonded thereto by said second glue layer; wherein said veneer is releasable from said rigid plate by splitting said paper layer such that said first surface portion of said paper layer remains affixed to said veneer.

2. The invention according to claim 1, wherein said paper layer comprises a plurality of fibers, such that said first surface portion of said paper layer forms an exposed fleece layer, opposite said veneer, when said veneer is separated from said rigid plate.

3. The invention according to claim 1, wherein said wood veneer includes a finished outer surface portion opposite said rigid plate.

4. The invention according to claim 3, wherein said finished outer surface portion of said wood veneer comprises a lacquer layer.

5. The invention according to claim 1, wherein said parting layer is impregnated with melamine.

6. The invention according to claim 1, wherein said wood veneer is configured as an inlay.

7. The invention according to claim 1, wherein said material comprises a second wood veneer carried on said first wood veneer opposite said rigid plate, and a second parting layer disposed between said first and second veneers; wherein said second parting layer is permanently fixed to said second veneers and releasably bound to said first veneer.

8. The invention according to claim 7, wherein each of said first and second parting layers comprise a paper layer.

9. The invention according to claim 7, wherein said second veneer is configured as an inlay.

10. The invention according to claim 8, wherein said first parting layer is impregnated with melamine.

11. The invention according to claim 1, wherein said first and second glue layers are hardened.

* * * * *